United States Patent
Tsengas

(10) Patent No.: US 6,854,419 B1
(45) Date of Patent: Feb. 15, 2005

(54) ADJUSTABLE HEIGHT PET FEEDER

(76) Inventor: Steven Tsengas, 1300 East St., Fairport Harbor, OH (US) 44077

( * ) Notice: Subject to any disclaimer, the term of this patent is extended or adjusted under 35 U.S.C. 154(b) by 60 days.

(21) Appl. No.: 10/434,734

(22) Filed: May 12, 2003

(51) Int. Cl.[7] .................................................. A01K 5/01
(52) U.S. Cl. ......................................... 119/51.5; 119/61
(58) Field of Search ........................... 119/51.5, 51.01, 119/52.1, 61, 72, 74; 220/8

(56) References Cited

U.S. PATENT DOCUMENTS

| | | | |
|---|---|---|---|
| 3,651,787 A | * 3/1972 | Cooper | 119/51.01 |
| D258,018 S | * 1/1981 | Venditto et al. | D30/130 |
| 4,624,382 A | * 11/1986 | Tontarelli | 220/8 |
| 4,658,759 A | * 4/1987 | Brown | 119/61 |
| 5,429,071 A | * 7/1995 | Altman | 119/61 |
| 5,562,212 A | * 10/1996 | Rosler | 206/443 |
| 5,884,582 A | * 3/1999 | Duckworth | 119/61 |
| 6,145,474 A | * 11/2000 | Lemkin | 119/61 |

OTHER PUBLICATIONS http://www.our-pets.com/dogfeeders/ Dog Feeders, pp. 1–4, Store–N–Feed feeder (pp. 2–3).*

* cited by examiner

Primary Examiner—Yvonne R. Abbott
(74) Attorney, Agent, or Firm—John D. Gugliotta; Olen L. York, III

(57) ABSTRACT

An adjustable height pet feeder comprises a dish element detachably removable from a base element. The dish element includes a pair of incurvate cups for receiving pet food and water. The dish element is adjustable about the base element via shim elements or toothed clasps variable about a plurality of vertical heights. The base element includes a base cavity formed within the interior of the base element, and provided for storing pet items as desired.

21 Claims, 12 Drawing Sheets

ADJUSTABLE HEIGHT PET FEEDER

RELATED APPLICATIONS

There are no previously filed, nor currently any co-pending applications, anywhere in the world.

BACKGROUND OF THE INVENTION

1. Field of the Invention

The present invention relates generally to pet feeders, and more specifically to an adjustable height pet feeder.

2. Description of the Related Art

Adjustable height pet feeders are beneficial in providing a pet with a comfortable eating position while enhancing digestion and overall health. Adjustable height pet feeders are especially beneficial as the pet matures in size. Accordingly, various adjustable height pet feeders have been developed. A search of the prior art did not disclose any patents that read directly on the claims of the instant invention; however, the following references were considered related:

U.S. Pat. No. 6,145,474, issued in the name of Lemkin, discloses an adjustable animal feeder assembly with storage capability;

U.S. Pat. No. 5,501,176, issued in the name of Tully, discloses a pet feeding apparatus;

U.S. Pat. No. 5,429,071, issued in the name of Altman, discloses an adjustable animal feeder holder;

U.S. Pat. No. 5,054,431, issued in the name of Coviello, discloses an adjustable animal feeder;

U.S. Pat. No. 4,976,223, issued in the name of Pierce, discloses an adjustable animal feeding apparatus;

U.S. Pat. No. 4,658,759, issued in the name of Brown, discloses an adjustable dog feeding tray means;

U.S. Pat. No. 4,205,629, issued in the name of Wix, discloses an adjustable height bowl holding apparatus;

U.S. Pat. No. 3,661,121, issued in the name of Zielin, discloses a dog feeding apparatus; and U.S. Pat. No. 3,651,787, issued in the name of Cooper, discloses an adjustable pet feeding stand.

Consequently, there exists a need for new ideas and enhancements for existing products in the pet feeder industry.

SUMMARY OF THE INVENTION

It is therefore an object of the present invention to provide an adjustable height pet feeder configured to accommodate the growth and physical maturity of a pet.

It is a feature of the present invention to provide an adjustable height pet feeder having a dish element detachably removable from a base element, wherein the dish element has a pair of incurvate cups for the placement and storage of pet food and/or water.

It is still a further feature of the present invention to provide an adjustable height pet feeder having adjustment means for adjusting the feeder upward or downward. One embodiment of the adjustment means includes a shim element having a linearly elongated, rectangular band with a first fin and a second fin opposite the first fin positioned along an upper veneer. The rectangular band further includes a cross-shaped recess for receiving a cross-shaped detent. An alternate embodiment provides a pair of clasps positioned along the lateral sides of the dish element, wherein each of the pair of clasps is a flexible and returnably resilient clasp having at least one elongated tooth for insertion into one of a plurality of apertures positioned at varying vertical heights along the lateral side of the base element.

It is still a further feature of the present invention to provide an adjustable height pet feeder having a variety of geometrical configurations and colors, and wherein the feeder is manufactured from a variety of materials, including light weight and inexpensive metal, plastics, porcelain, rubber and other similar items.

Briefly described according to one embodiment of the present invention, an adjustable height pet feeder comprises a dish element detachably removable from a base element. The dish element includes a pair of incurvate cups for receiving pet food and water. The dish element is adjustable about the base element via adjustment means, including shim elements or clasps variable about a plurality of vertical heights. The base element includes a base cavity formed within the interior of the base element, and provided for storing pet items as desired.

The use of the present invention provides users with all of the materials and tools necessary to ensure that a user may easily install, use and maintain an adjustable height pet feeder.

An advantage of the present invention is that it is specifically adapted for home use because of the light weight components and the use of inexpensive materials.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1 through 20.

1. Detailed Description of the Figures

Figure 1:
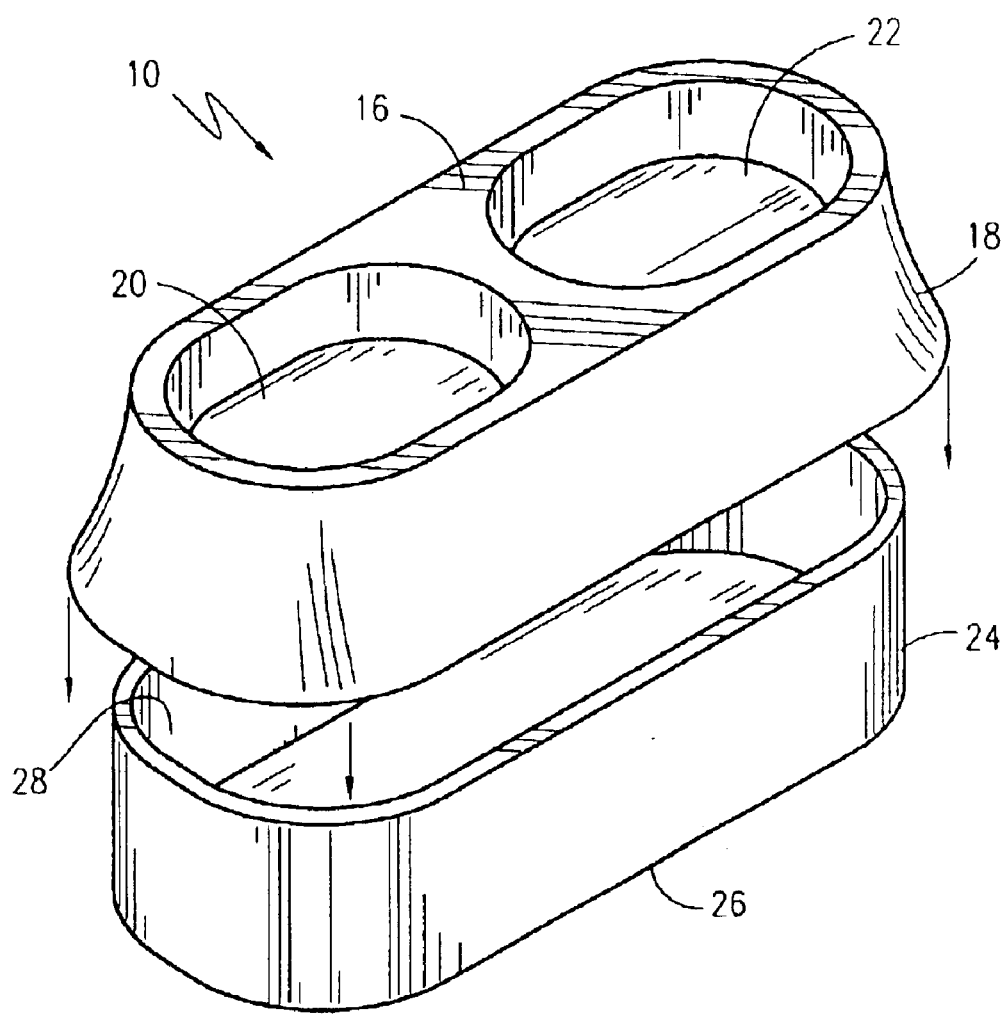
FIG. 1 is an exploded perspective view of an adjustable pet feeder, having an elliptical dish element which attaches to the top of a base element, as indicated by the arrows.
Figure 2:
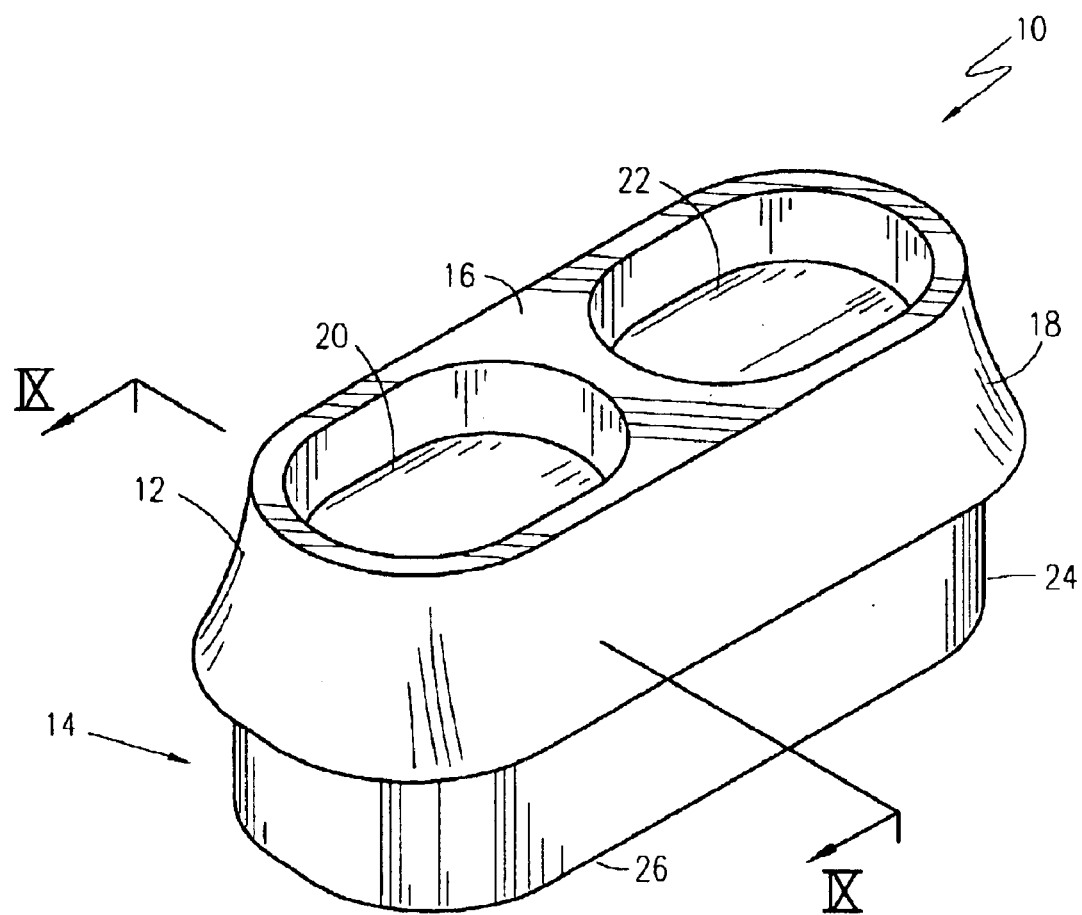
FIG. 2 is a perspective view of the adjustable pet feeder of FIG. 1, wherein the elliptical dish element is resting atop the base element at an optimum height adjustment level.

Referring now to FIG. 1 and FIG. 2, an adjustable height pet feeder 10 is shown in accordance with the preferred embodiment of the present invention. The adjustable height pet feeder 10 comprises a dish element 12 detachable from a base element 14. The dish element 12 includes an upper sidewall 18 depending from a horizontally planar top surface 16. A pair of incurvate cups, first cup 20 and second cup 22, are formed in the planar surface 16 and provide an area for the placement of food and water for a pet. The base element 14 includes a lower sidewall 24 depending from a horizontally planar bottom surface 26, wherein the lower sidewall 24 and the bottom surface 26 form a base cavity 28. The dish element 12 is adjustable about the base element 14 via adjustment means, described below.

Figure 14:
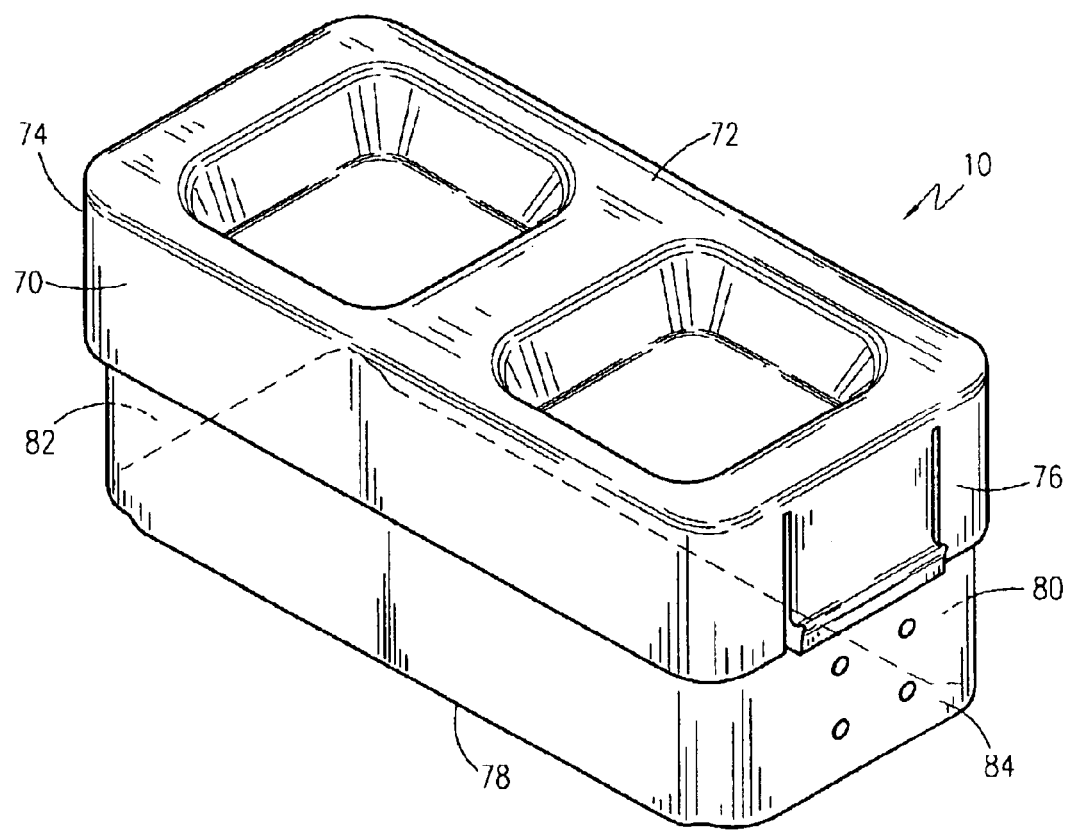
FIG. 14 is a perspective view of an alternative embodiment of the dish element, wherein the dish element has a rectangular perimeter instead of the elliptical configuration of FIG. 1 or FIG. 2.

The base element 14 may have a curvilinear perimeter (as depicted in FIG. 1) or a rectangular perimeter (as depicted in FIG. 14). In the base element 14 having a curvilinear perimeter, the lower sidewall 24 is a continuous curvilinear wall. In the base element 14 having a rectangular perimeter (FIG. 14), the lower sidewall is a series of enclosures comprising a front enclosure 78, a back enclosure 80 opposite the front enclosure 78, a first side enclosure 82 depending from the front and back enclosures 78 and 80 and the bottom surface 26, and a second side enclosure 84 opposite the first side enclosure 82 and depending from the front and back enclosures 78 and 80 and the bottom surface 26. The front and back enclosures 78 and 80, the first and second side enclosures 82 and 84 and the bottom surface 26 form a base cavity 28. The base cavity 28 is used for the storage of pet food.

Figure 3:
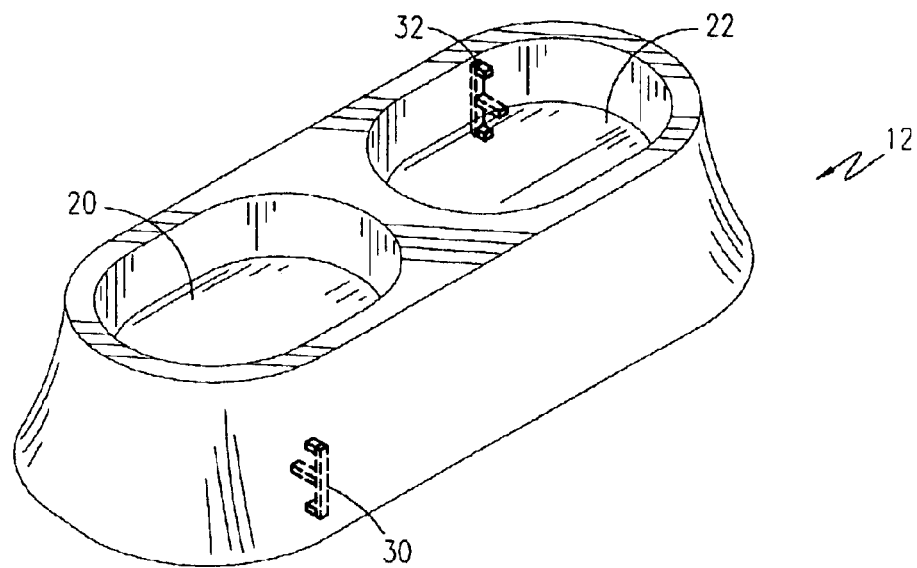
FIG. 3 is a perspective view of the dish element only, illustrating the relative positioning of the shim elements in a two-shim element configuration, wherein the first shim element is positioned anteriorly to a first cup, and the second shim element is positioned posteriorly to a second cup.
Figure 4:
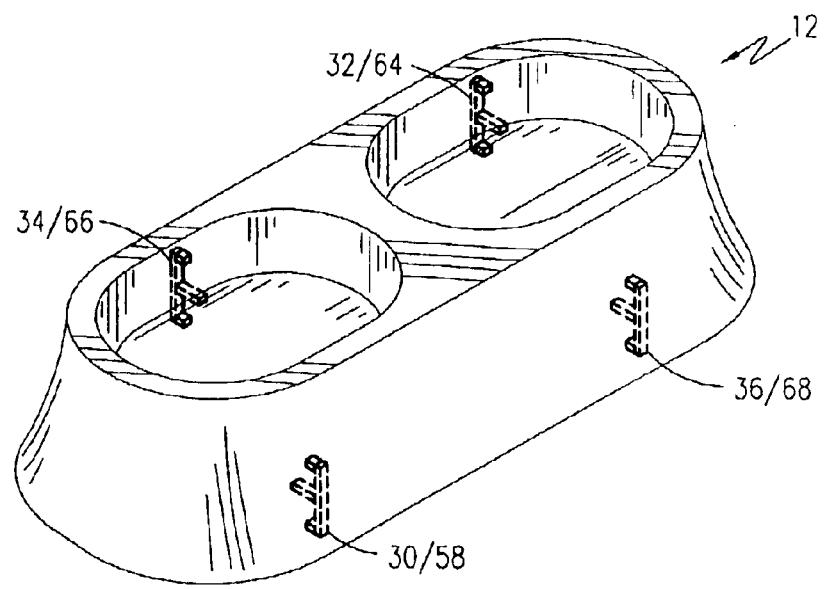
FIG. 4 is a perspective view of the dish element only, illustrating an alternative configuration of the shim elements and resulting in a four-shim element configuration, wherein a third shim element is added at a position posterior to the first cup and opposite to the first shim element, and a fourth shim element is added at a position anterior to the second cup and opposite the second shim element.

Referring now to FIG. 3 and FIG. 4, the dish element 12 is shown exclusively. In FIG. 3, the dish element 12 includes a pair of shim elements, first shim element 30 and second shim element 32. The first shim element 30 may be positioned either anterior to the first cup 20 (as depicted in FIG. 3) or posterior to the first cup 20 (or opposite to the depiction of FIG. 3). The second shim element 32 is positioned diagonally to the first shim element 30, as in FIG. 3, which depicts the second shim element 32 positioned posterior to the second cup 22. In an alternative embodiment, as shown in FIG. 4, a third shim element 34 is positioned posterior to the first cup 20, and opposite to the first shim element 30. A fourth shim element 36 is positioned anterior to the second cup 22, and opposite to the second shim element 32.

The base cavity 28 is formed within an interior portion of the base element 14, enveloped by front, back and side enclosures 78, 80, 82, 84 and the bottom surface 26. The base cavity 28 provides a storage volume for various items, including pet toys, pet treats, excess pet food, small-length leases, appropriately sized tie-downs, or other similar pet items. Not only may the base cavity 28 store such items within the home or yard, but provides the feeder 10 with a degree of portability in that storage and transport of the aforementioned storage items may be easily stored and accounted for.

Figure 5:
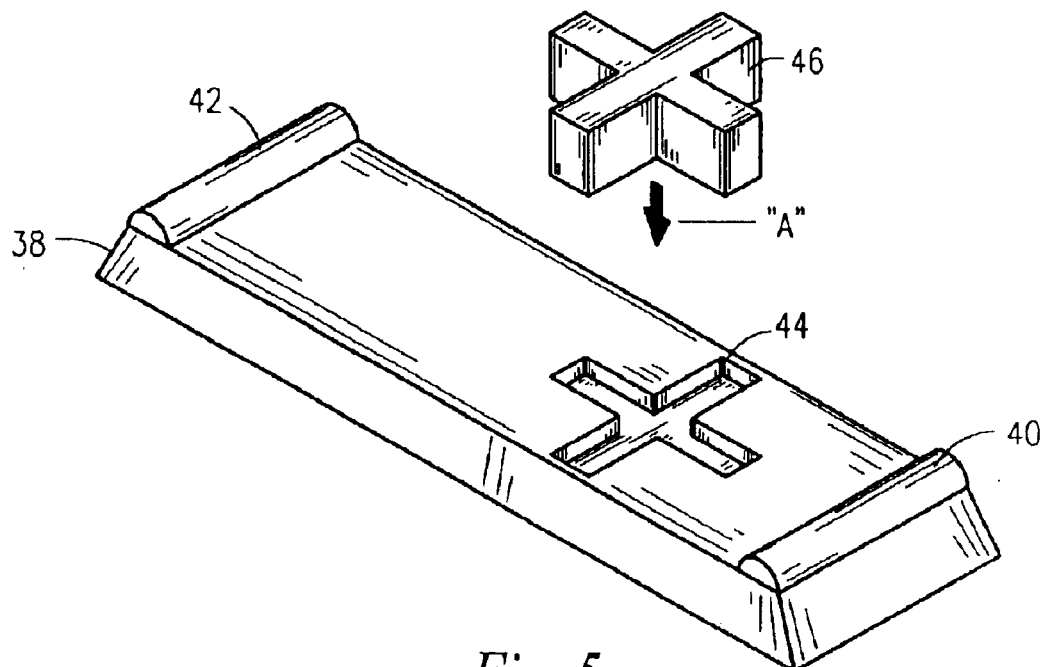
FIG. 5 is an exploded perspective view of a representative shim element, wherein a cross-shaped detent is detached from a cross-shaped recess.
Figure 6:
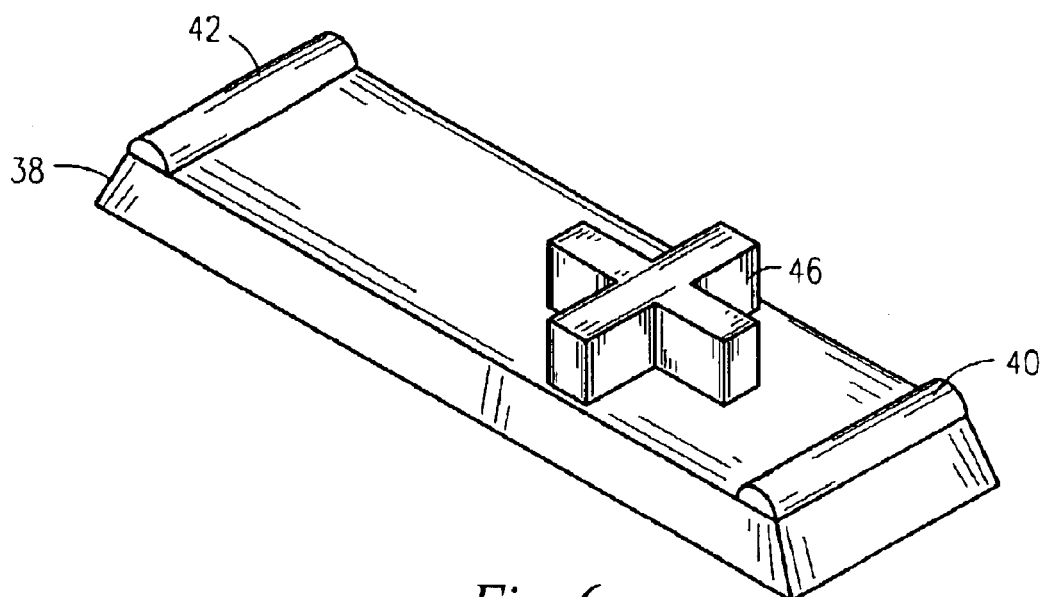
FIG. 6 is a perspective view of the representative shim element of FIG. 5, wherein the cross-shaped detent is forcibly impinged within the cross-shaped recess.

Referring now to FIG. 5 and FIG. 6, one embodiment of adjustment means is a shim element 30, 32, 34 or 36 is depicted, wherein an explanation and depiction of the first shim element 30 will serve as a representative model of the other shim elements 32, 34 or 36. The shim element 30 includes a linearly elongated, rectangular band 38 having a first fin 40 and a second fin 42 opposite the first fin 40 positioned along an upper veneer 38a. The rectangular band 38 further includes a cross-shaped recess 44 for receiving a cross-shaped detent 46. As indicated by arrow "A", the detent 46 is forced into the recess 44, thereby forming the shim element 30, 32, 34 or 36 depicted in FIG. 5 and FIG. 6.

Figure 7:
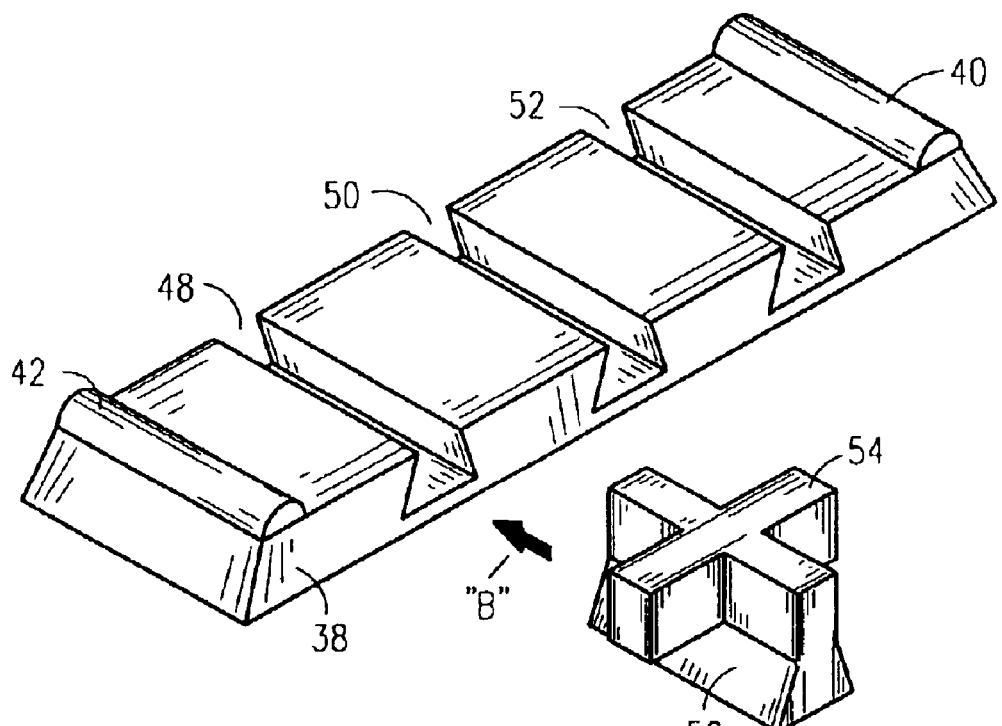
FIG. 7 is an exploded perspective view of an alternative embodiment of a representative shim element, wherein the shim element contains a plurality of channels for receiving an angled spline found on a bottom portion of the cross-shaped detent.
Figure 8:
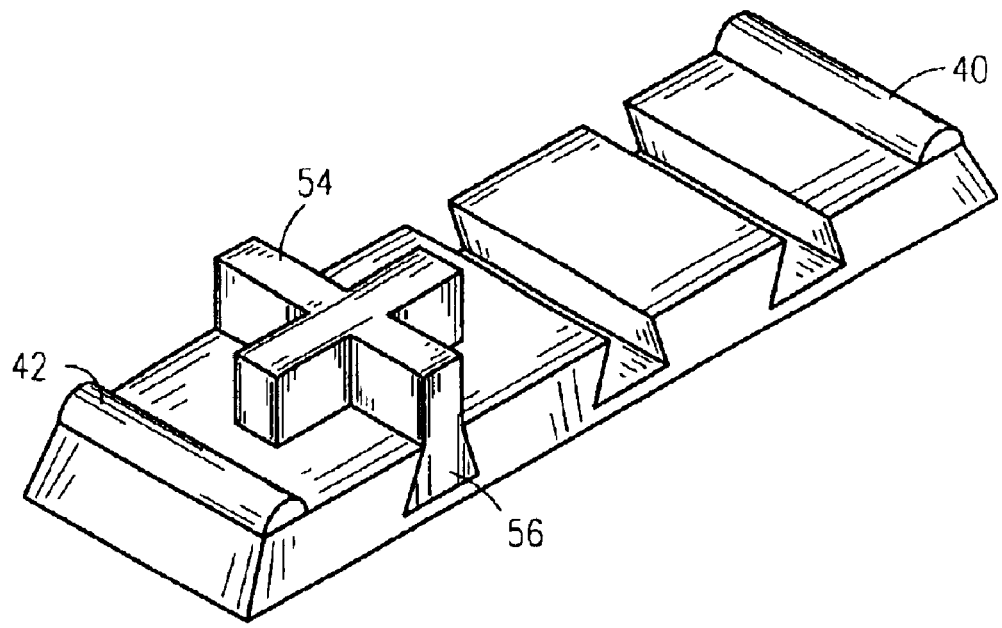
FIG. 8 is a perspective view of alternative shim element of FIG. 7, wherein the cross-shaped detent is slidably inserted and impinged within a channel.

Referring now to FIG. 7 and FIG. 8, an alternative embodiment of the shim element 30, 32, 34 or 36 is depicted, wherein an explanation and depiction of the first shim element 30 will serve as a representative model of the other shim elements 32, 34 or 36. Like the first shim element 30 of FIG. 5 and FIG. 6, the shim element 30 includes a linearly, elongated, rectangular band 38 having a first fin 40 and a second fin 42 opposite the first fin 40. However, the rectangular band 38 further includes a plurality of channels 48, 50 and 52 for receiving a cross-shaped detent 54 having an angled spline 56 slidably inserted, as indicated by arrow "B", into a channel 48, 50 or 52.

Figure 9:
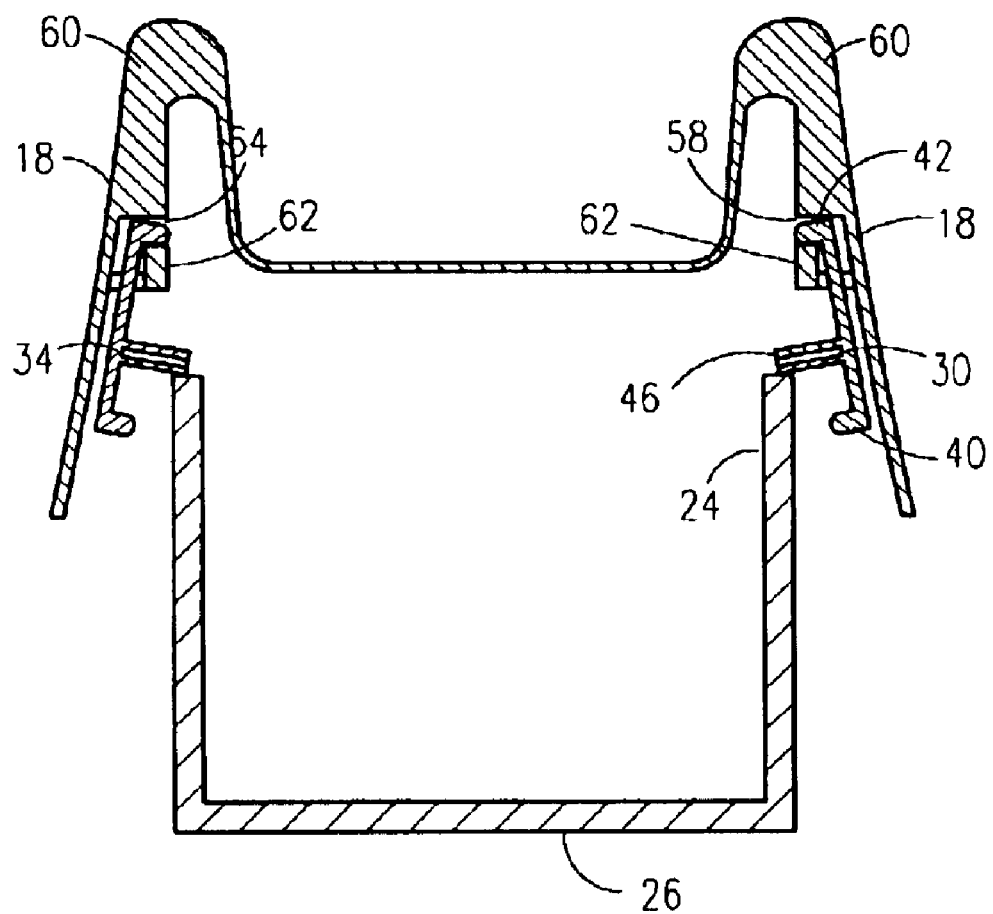
FIG. 9 is a cross-sectional view of the adjustable pet feeder, taken along the line IX—IX of FIG. 2, illustrating the way in which the shim elements rest atop the sidewalls to achieve an optimum height adjustment level.
Figure 10:
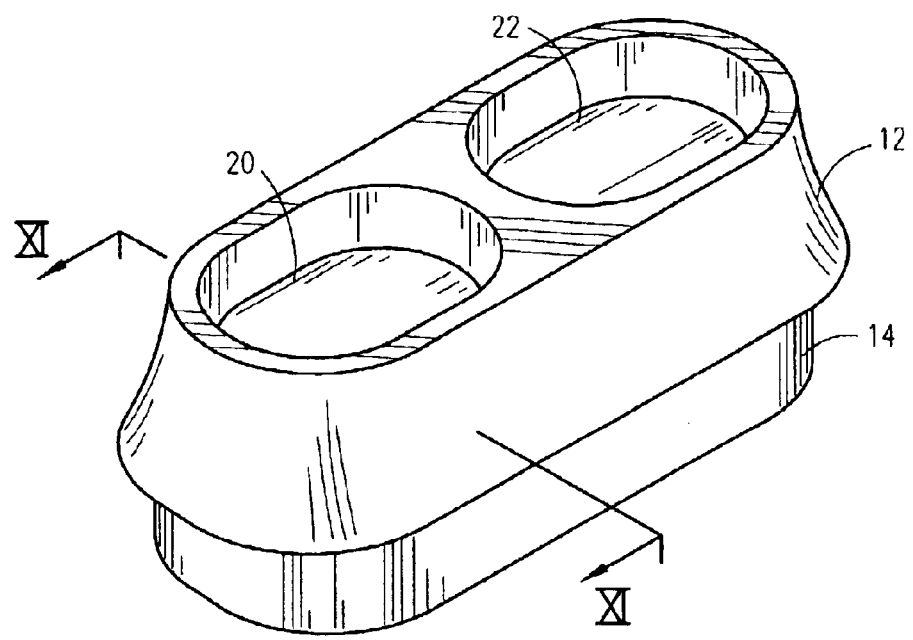
FIG. 10 is a perspective view of the adjustable pet feeder, wherein the elliptical dish element is resting atop the base element at an intermediate height adjustment level
Figure 11:
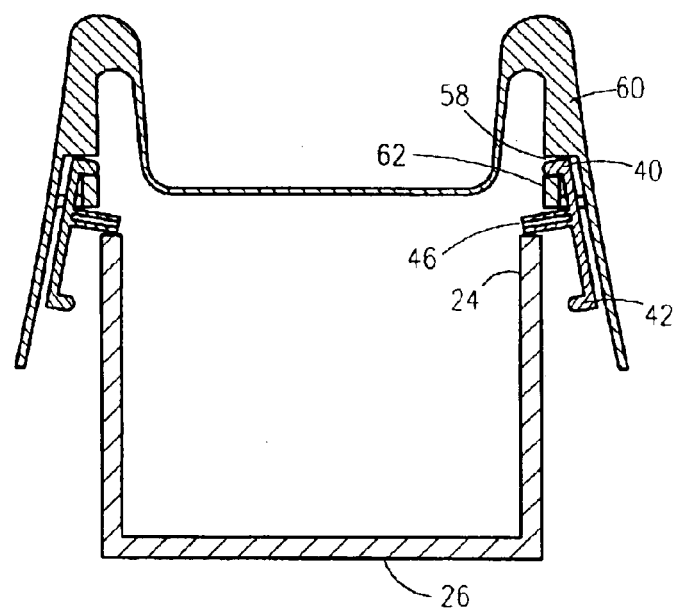
FIG. 11 is a cross-sectional view of the adjustable pet feeder, taken along the line XI—XI of FIG. 10, illustrating the way in which the shim elements rest atop the sidewalls to achieve an intermediate height adjustment level.
Figure 12:
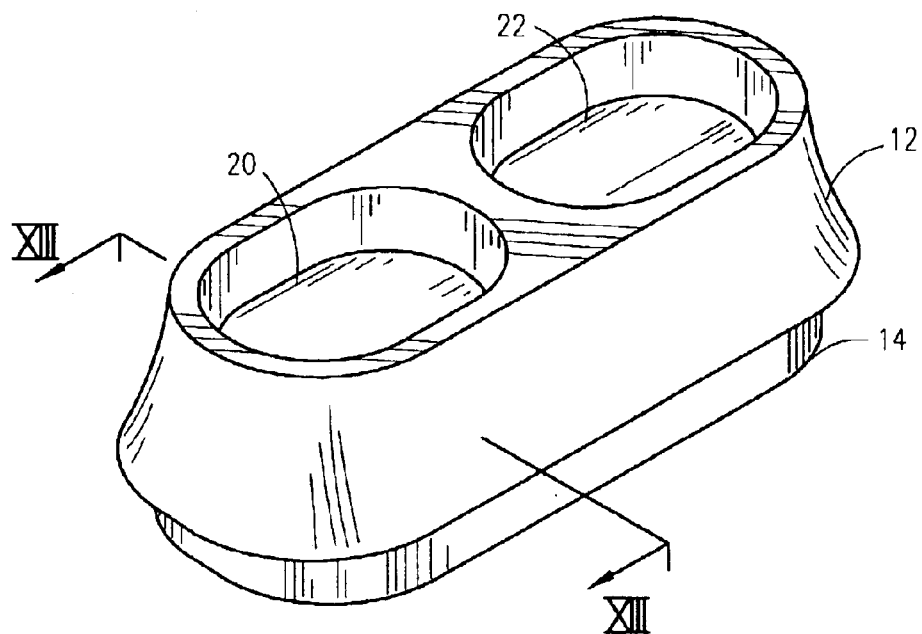
FIG. 12 is a perspective view of the adjustable pet feeder, wherein the elliptical dish element is resting atop the base element at a minimum height adjustment level.
Figure 13:
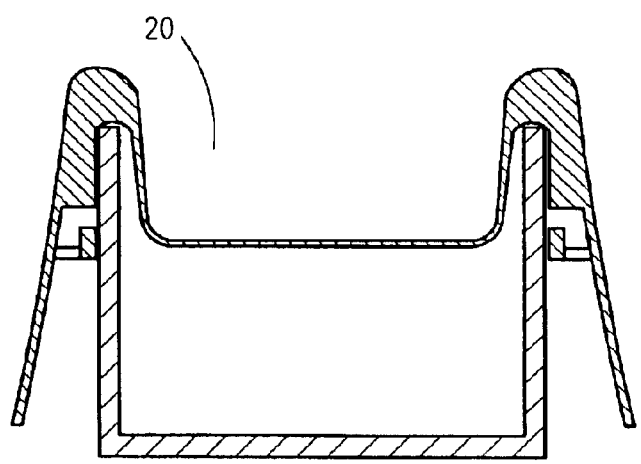
FIG. 13 is a cross-sectional view of the adjustable pet feeder, taken along the line XIII—XIII of FIG. 12, illustrating the removal of the shim elements to allow the dish element to rest atop the sidewalls at a minimum height adjustment level.

Referring now to FIG. 4 and FIG. 9 through FIG. 13, the adjustable height pet feeder 10 is shown as the embodiment having four shim elements 30, 32, 34 or 36, although it should be realized that a depiction of the two shim element embodiment (having first shim element 30 and second shim element 32) in the cross-sectional view of FIG. 9 and FIG. 11 would result in the deletion of one of the shim elements depicted. The first shim element 30 and the third shim element 34 are shown in FIG. 9 and FIG. 11, wherein the first and third shim elements 30 and 34 are placed within a first shim element orifice 58 and a third shim element orifice 66. The first, second, third or fourth shim element orifice 58, 64, 66 or 68 is formed along an internal surface of the upper sidewall 18 and is bound by the upper sidewall 18, a linearly elongated post 60 and an L-shaped brace 62. As is shown in FIG. 9, an optimum dish element 12 height is achieved by inserting the second fin 42 through the first shim element orifice 58, and between a lower end of post 60 and an upper end of brace 62. The detent 46 rests on the top end of the lower sidewall 24, thereby suspending the dish element 12 at a desired height on top of the lower sidewall 24 of the base element 14. As is shown in FIG. 11, an intermediate dish element 12 height is achieved by inserting the first fin 40 through the first shim element orifice 58, and between a lower end of post 60 and an upper end of brace 62. The detent 46 rests on the top end of the lower sidewall 24, thereby suspending the dish element 12 at a desired height on top of the lower sidewall 24 of the base element 14. As is shown in FIG. 13, a minimum dish element 12 height is achieved by removing the shim elements 30 and 34 from the first and third shim element orifices 58 or 66. Thus, the top end of the lower sidewall 24 rests between an internal surface of the first cup 20 and a surface of the post 60. Corresponding perspective views of FIG. 9, FIG. 11 and FIG. 13 are FIG. 4, FIG. 10 and FIG. 12, respectively, wherein the dish element 12 is at its optimum height in FIG. 4 and FIG. 9, at an intermediate height in FIG. 10 and FIG. 11, and at a minimum height in FIG. 12 and FIG. 13.

Referring now to FIG. 14, an alternative embodiment of the adjustable pet feeder 10 is shown. In the alternative embodiment depicted, the adjustable pet feeder 10 includes a dish element 12 having a rectangular perimeter, as opposed to the elliptical perimeter of FIG. 1 and FIG. 2. The upper sidewall 18 includes a front wall 70, a back wall 72 opposite to the front wall, a first panel 74 depending from the front and back walls 70 and 72, and a second panel 76 opposite to the first panel 74 and depending from the front and back walls 70 and 72. The front and back wall 70 and 72 and the first and second panels 74 and 76 form the rectangular perimeter about the dish element 12. The rectangular perimeter provides a uniform appearance between the dish element 12 and the base element 14. The rectangular perimeter may also provide more storage volume within the first and second cups 20 and 22 in comparison to the dish element 12 of FIG. 1 and FIG. 2. Finally, the rectangular perimeter may also provide ease of use when disassembling or adjusting the dish element 12.

Referring now to FIG. 15 through FIG. 20, an alternative embodiment of the present invention is shown. An adjustable height pet feeder 100 comprises a dish element 102 detachable from a base element 104 and is substantially identical to the previously disclosed embodiments except for the means of height adjustment. A pair of flexible clasps 106 and 108 are positioned about the lateral sides of the dish element 102, wherein one clasp 106 is positioned about one lateral side and the other clasp 108 is positioned about the opposite lateral side of the dish element 102.

Figure 15:
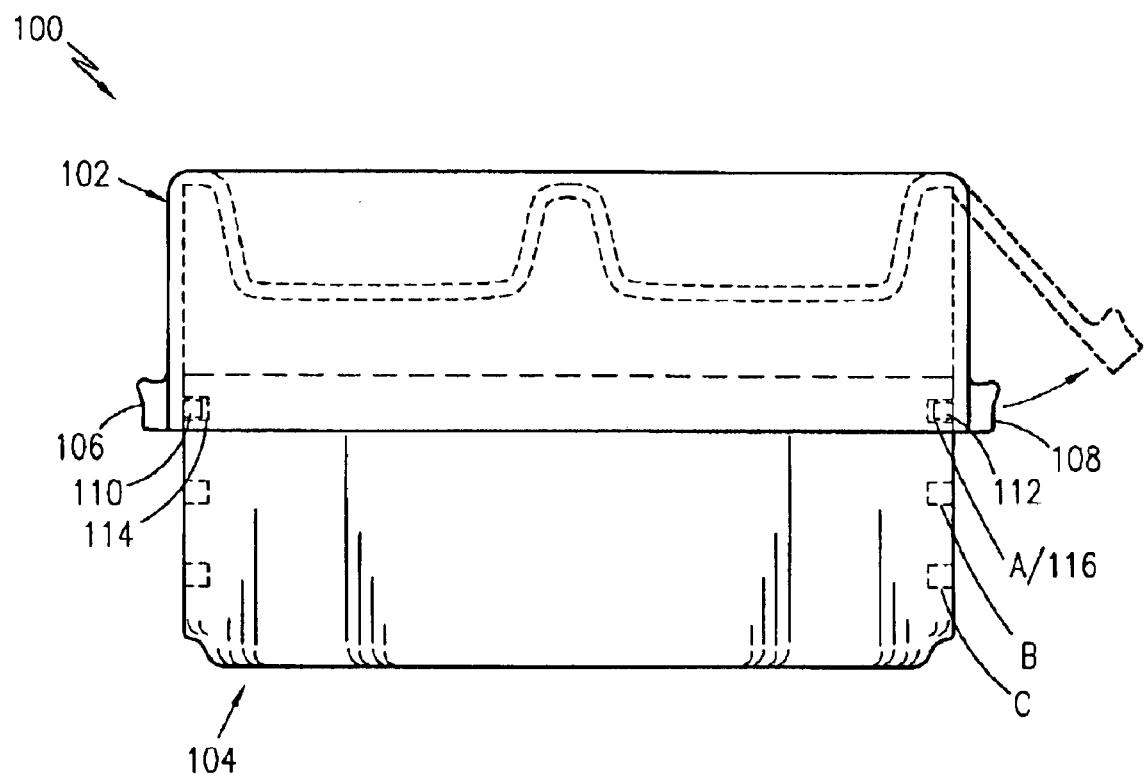
FIG. 15 is a front or rear view of an alternate embodiment of the adjustable height pet feeder, wherein the feeder includes a pair of clasps positioned along the lateral sides of the feeder and adjusted to a maximum height.
Figure 16:
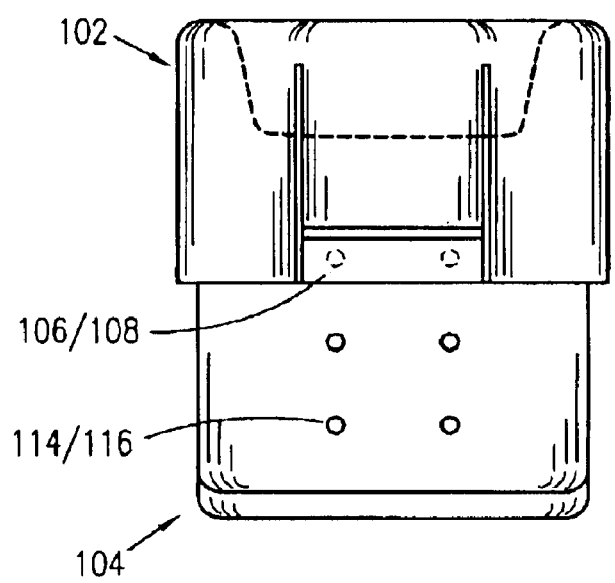
FIG. 16 is a side view of the alternate embodiment of the feeder disclosed in FIG. 15.
Figure 17:
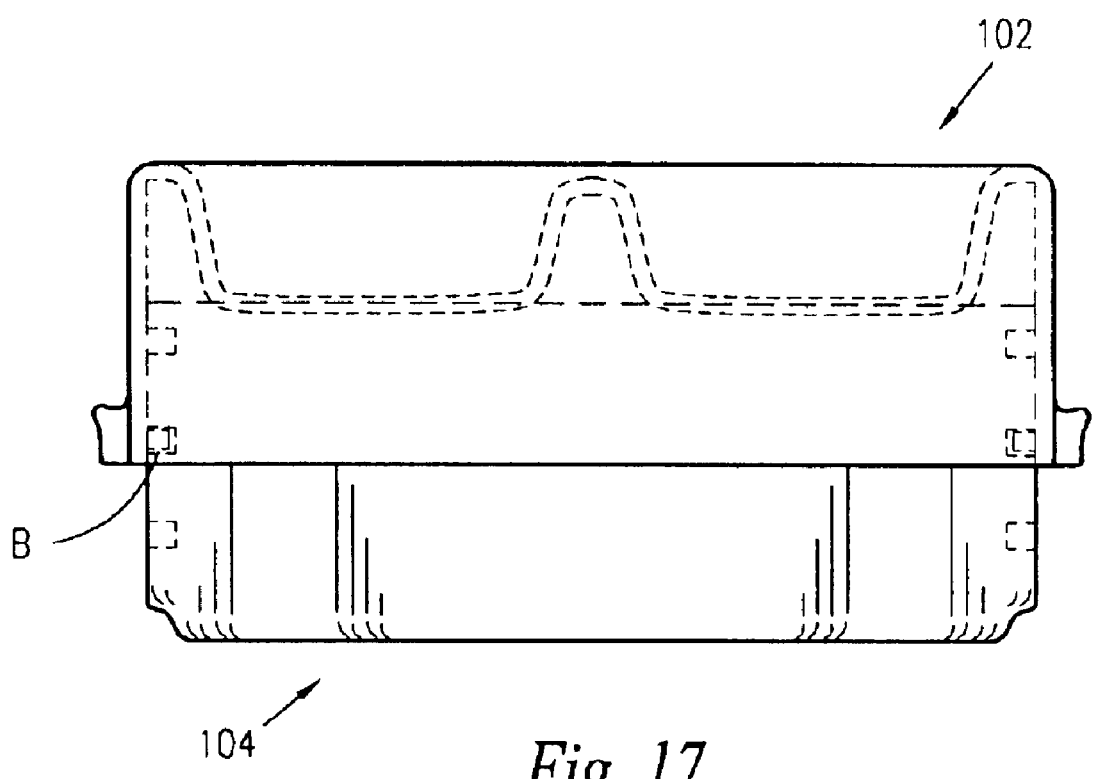
FIG. 17 is a front or rear view of the alternate embodiment of FIG. 15, wherein the feeder is adjusted to an intermediate height.
Figure 18:
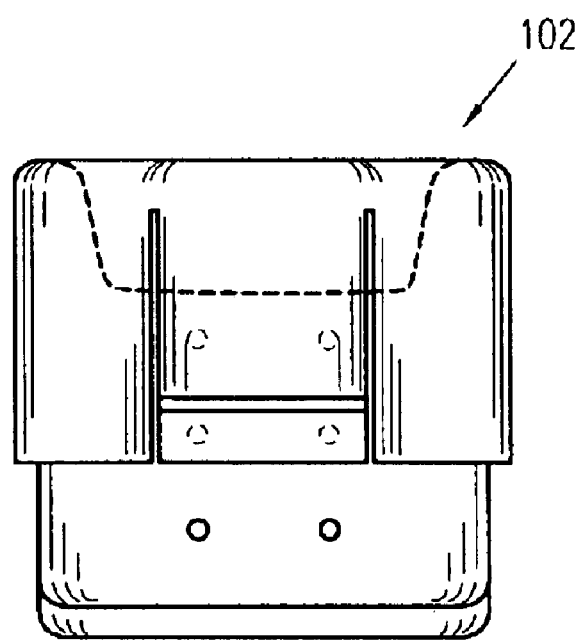
FIG. 18 is a side view of the alternate embodiment of the feeder disclosed in FIG. 17.
Figure 19:
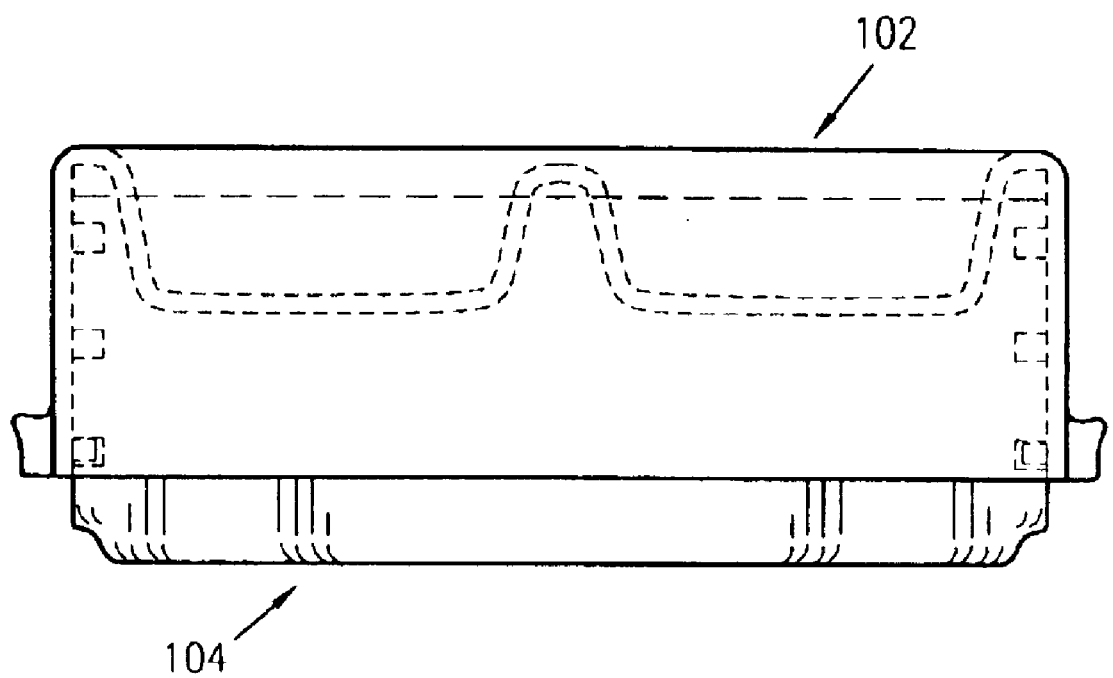
FIG. 19 is a front or rear view of the alternate embodiment of FIG. 15, wherein the feeder is adjusted to a minimum height.
Figure 20:
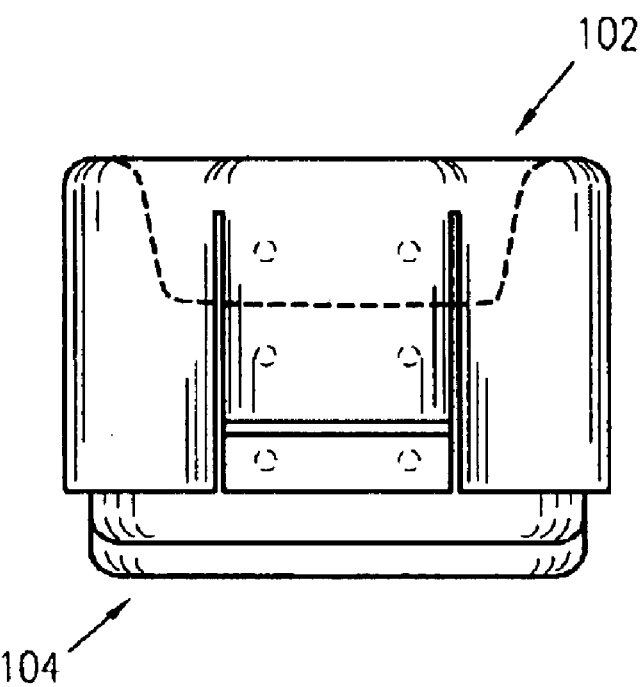
FIG. 20 is a side view of the alternate embodiment of the feeder disclosed in FIG. 20.

The clasps 106 and 108 are identical mirror images of one another, thus description of one will serve as a representative model of the remaining clasp. Clasp 106 is a flexible member that is returnably resilient to a position adjacent to the lateral sides of dish element 102 (illustrated by phantom lines and reciprocal arrow of FIG. 15). Near the horizontal bottom of the clasp 106 is at least one tooth 110 elongated for insertion into an aperture 114 configured to receive and house the tooth 110. The aperture 114 may be formed in the lateral sides of the base element 104 at a variety of heights, including the three heights characterized by the letters "A", "B" and "C". It is envisioned that more or fewer heights may be provided. As shown in the embodiment depicted in FIG. 15 through FIG. 20, a pair of teeth 110 and 112 are provided and inserted into a pair of apertures 114 and 116 about one lateral side of the adjustable height pet feeder 100. It is further envisioned that in addition to the single and double teeth embodiments, a plurality of teeth corresponding to a plurality of apertures may be provided without departing from the spirit and scope of the invention as disclosed. FIG. 15 and FIG. 16 depicts the feeder 100 set at a maximum height. FIG. 17 and FIG. 18 depicts the feeder 100 set at an intermediate height. FIG. 19 and FIG. 20 depicts the feeder 100 set at a minimum height.

It is envisioned that other styles and configurations of the present invention can be easily incorporated into the teachings of the present invention, and only one particular configuration shall be shown and described for purposes of clarity and disclosure and not by way of limitation of the scope.

2. Operation of the Preferred Embodiment

To use the present invention it its preferred or alternative embodiments involves the height adjustment of the feeder 10 or 100 in relation to the growth and maturity of the pet feeding from the feeder 10 or 100. The feeder settings, either the shim elements depicted and described in FIG. 1 through FIG. 14, or the flexible and returnably resilient clasps of FIG. 15 through FIG. 20, are adjusted to the appropriate level in accordance with the descriptions of the elements previously described. The upward or downward adjustment of the feeder 10 or 100 further allows for use of the feeder 10 or 100 with multiple pets of various sizes.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. An adjustable pet feeder comprising:
   a dish element, said dish element including a horizontally planar top surface, an upper sidewall depending from said top surface, and a pair of incurvate cups formed along said top surface for receiving and housing pet food and water;
   a base element, said base element including a horizontally planar bottom surface, a lower sidewall, said lower sidewall depending from said bottom surface;
   a base cavity, said base cavity formed within said base element and provided for storage of pet items; and
   height adjustment means, said height adjustment means for vertically adjusting the height of said feeder between a maximum height and a minimum height;

said height adjustment means comprising a plurality of shim element orifices, wherein each of said plurality of shim element orifices is formed along an internal surface of said dish element, said plurality of shim element orifices bound by an upper sidewall, a linearly elongated post depending from a top surface and a brace; and a plurality of shim elements, said plurality of shim elements insert into said plurality of shim element orifices, thereby providing means for suspending said dish element on top of said base element.

2. The adjustable pet feeder of claim 1, wherein said plurality of shim element orifices include a pair of shim element orifices, said pair of shim element orifices including a first shim element orifice and a second shim element orifice.

3. The adjustable pet feeder of claim 2, wherein said first shim element orifice is positioned anterior to one of said pair of cups, said second shim element orifice is positioned posterior to remaining said cup.

4. The adjustable pet feeder of claim 3, wherein said first shim element orifice is positioned posterior to one of said pair of cups, said second shim element orifice is positioned anterior to remaining said cup.

5. The adjustable pet feeder of claim 1, wherein said plurality of shim element orifices include a first shim element orifice, a second shim element orifice, a third shim element orifice and a third shim element orifice.

6. The adjustable pet feeder of claim 5, wherein said first shim element orifice is positioned anterior to one of said pair of cups, said third shim element orifice is positioned opposite to said first shim element orifice and posterior to said one of said pair of cups;

said second shim element orifice is positioned posterior to said remaining cup, said fourth shim element orifice is positioned opposite to said second shim and anterior to said remaining cup.

7. The adjustable pet feeder of claim 1, wherein each of said plurality of shim elements comprises:

a linearly elongated, rectangular band, said band including a planar upper veneer;

a first fin, said first fin having an arcuate shape and projecting from an end of said upper veneer;

a second fin, said second fin having an arcuate shape and projecting from an end of said upper veneer opposite to said first fin;

detent retaining means, said detent retaining means formed in said upper veneer; and a detent, said detent forcibly inserted into and accommodated by said detent retaining means.

8. The adjustable pet feeder of claim 7, wherein said detent retaining means comprises a cross-shaped detent recess formed in said upper veneer, said detent recess accommodating insertion of said detent.

9. The adjustable pet feeder of claim 8, wherein said detent retaining means comprises a plurality of detent channels formed in said upper veneer, said plurality of detent channels spaced evenly apart along said upper veneer, said plurality of detent channels accommodating slidable insertion of said detent.

10. The adjustable pet feeder of claim 9, wherein said plurality of shim elements include a pair of shim elements, said pair of shim elements including a first shim element and a second shim element.

11. The adjustable pet feeder of claim 10, wherein said first shim element is inserted into a first shim element orifice, said second shim element is inserted into a second shim element orifice.

12. The adjustable pet feeder of claim 9, wherein said plurality of shim elements include a first shim element, a second shim element, a third shim element and a fourth shim element.

13. The adjustable pet feeder of claim 12, wherein said first shim element is inserted into a first shim element orifice, said second shim element is inserted into a second shim element orifice, said third shim element is inserted into a third shim element orifice, said fourth shim element is inserted into a fourth shim element orifice;

said first shim element, said second shim element, said third shim element and said fourth shim element capable of resting at a top of said base element so as to suspend said dish element from said base element.

14. The adjustable pet feeder of claim 1, wherein said height adjustment means comprises a pair of flexible clasps returnably resilient about the lateral sides of said dish element, wherein one of said pair of clasps is positioned about one lateral side and the other of said pair of clasps is positioned about an opposite lateral side of said dish element.

15. The adjustable pet feeder of claim 14, wherein each of said pair of clasps comprise at least one elongated tooth removably insertable into a plurality of apertures formed along a lateral sidewall of said base element.

16. The adjustable pet feeder of claim 15, wherein said plurality of apertures are aligned at a plurality of heights for receipt and housing of said tooth, thereby permitting vertical adjustment of said feeder between said maximum height and said minimum height.

17. The adjustable pet feeder of claim 1, wherein said lower sidewall comprises a continuous curvilinear perimeter forming an elliptical perimeter about said base element.

18. The adjustable pet feeder of claim 1, wherein said lower sidewall comprises:

a front enclosure;

a back enclosure, said back enclosure opposite to said front enclosure;

a first side enclosure, said first side enclosure depending from said front enclosure and said back enclosure; and a second side enclosure, said second side enclosure opposite to said first side enclosure, said second side enclosure depending from said front enclosure and said back enclosure; said front enclosure, said back enclosure, said first side enclosure and said second side enclosure forming a rectangular perimeter about said base element.

19. The adjustable height pet feeder of claim 1, wherein said upper sidewall includes a continuous curvilinear perimeter forming an elliptical perimeter about said dish element.

20. The adjustable pet feeder of claim 1, wherein said upper sidewall comprises:

a front wall;

a back wall, said back wall opposite to said front wall;

a first panel, said first panel depending from said front wall and said back wall; and a second panel, said second panel opposite said first panel, said second panel depending from said front wall and said back wall;

said front wall, said back wall, said first panel and said second panel forming a rectangular perimeter about said dish element.

21. The adjustable pet feeder of claim 1, wherein said pair of incurvate cups comprise a first cup and a second cup, said first cup and said second cup sized to have substantially identical volumetric dimensions.

* * * * *